Patented Jan. 17, 1928.

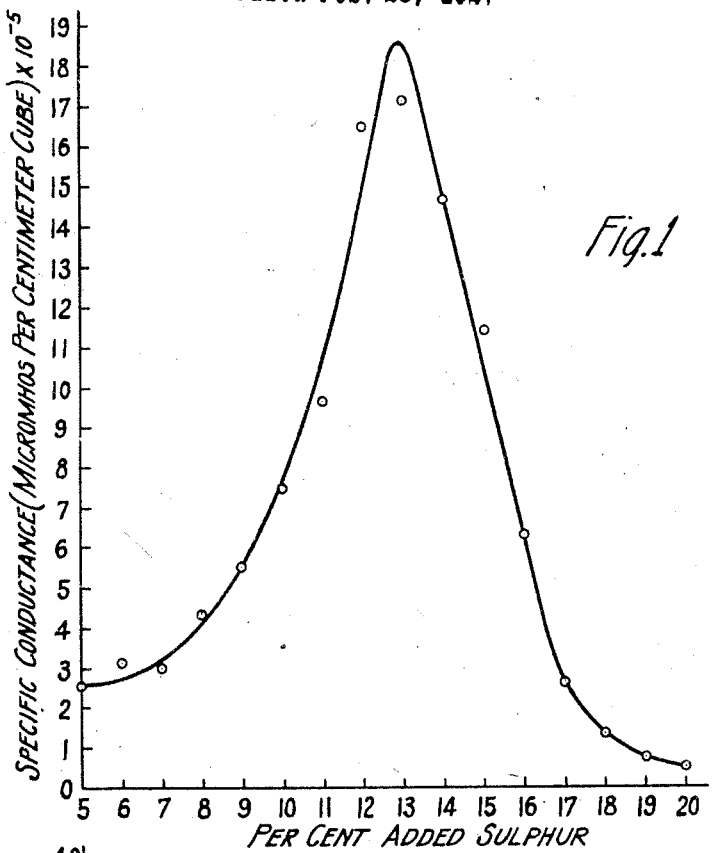
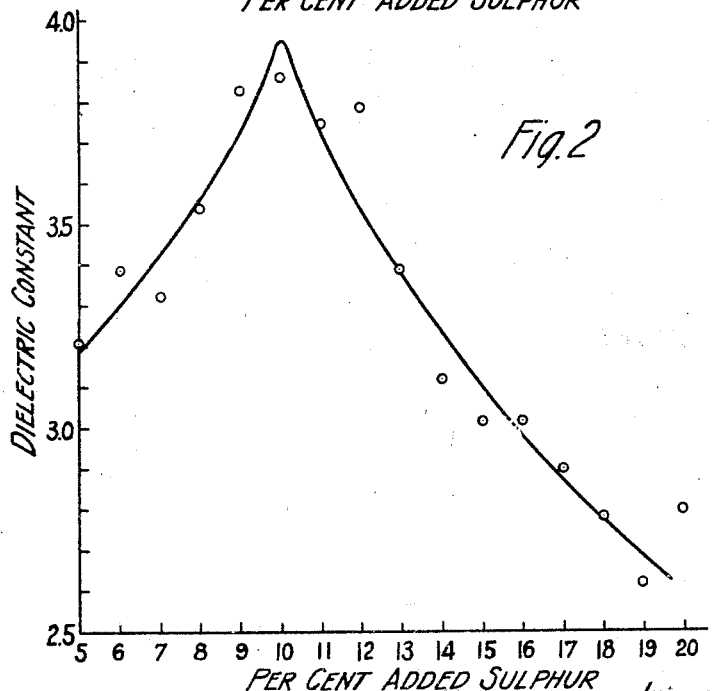

1,656,737

UNITED STATES PATENT OFFICE.

ARCHIE R. KEMP, OF WESTWOOD, NEW JERSEY, ASSIGNOR TO BELL TELEPHONE LABORATORIES, INCORPORATED, OF NEW YORK, N. Y., A CORPORATION OF NEW YORK.

INSULATING MATERIAL AND METHOD OF PRODUCING THE SAME.

Application filed February 28, 1927. Serial No. 171,396.

This invention relates to insulating materials, particularly those suitable for insulating conductors of submarine cables, and to methods for producing such materials.

In accordance with my copending application, Serial No. 725,691, filed July 12, 1924, issued on August 9, 1927, as Patent 1,638,535, there is disclosed a material which is produced by mixing rubber with 8 to 16% sulphur by weight and heating the mixture (or the material resulting from vulcanizing the mixture) to a high temperature sufficient to produce a material having thermoplastic properties similar to those possessed by gutta percha in the temperature range extending from temperatures at which gutta percha insulated conductors are ordinarily used to the temperatures employed in extruding.

In accordance with the present invention there is provided an insulating material having mechanical properties similar to those of the material of my earlier application and somewhat improved electrical properties with respect to its use as submarine cable insulation. The superiority of this material results from its being a mixture in proper proportions of a plurality of rubber compounds of different characteristics. In a preferred embodiment of the invention, one of the compounds is made by mixing approximately 5% sulphur by weight with 95% raw rubber and heated to high temperature, preferably about 235° C. and another of the compounds is made in a similar manner from a mixture of 20% sulphur and 80% rubber by weight.

The invention may be better understood by referring to the following description together with the accompanying drawing in which:

Fig. 1 is a curve showing the conductance of thermoplastic compounds the constituents of which comprise raw rubber and sulphur in different proportions, respectively; and Fig. 2 is a curve showing the dielectric constants of the thermoplastic compounds for which values of conductance are indicated in the curve of Fig. 1.

The samples employed in obtaining the curves of Figs. 1 and 2 were prepared by mixing raw rubber and sulphur in a standard rubber mill. After being thoroughly mixed, the ingredients were raised from room temperature to a temperature of approximately 225° C. over a period of approximately 70 minutes and were maintained at this temperature for about 20 minutes. Heating the mixture to this temperature, which is higher than that required for vulcanization, causes a change in the structure of the rubber which is accompanied by the liberation of hydrogen sulphide and which results in changing the material from a substantially non-plastic to a thermoplastic condition. The degree to which the material is rendered thermoplastic depends on its composition, the heating temperature and the time for which it is subject to heating. The samples of thermoplastic material were tested at approximately room temperature and the dielectric constant was measured at a frequency of about 1,000 cycles per second.

It has been found that when approximately 84% to 92% raw rubber by weight is mixed with from 8 to 16% sulphur and then heat treated as described above, there is produced a material having approximately the thermoplastic properties of gutta percha and one which is, therefore, particularly suited from a mechanical standpoint for insulating submarine cable conductors. This material is soft and can be extruded about a conductor similarly to gutta percha at temperatures such as are ordinarily maintained during the extrusion process, that is, temperatures not appreciably in excess of 100° C. At room temperature the material becomes tough and retains its form as is the case with gutta percha. Like gutta percha, moreover, the material may be cooled below 0° C. without becoming brittle.

As indicated by the curves a material, which before vulcanization contains approximately 12½% sulphur, has a peak value of conductance, that is, such a material has a higher conductance than a material which contains more or less sulphur than this amount. Moreover, a material which before vulcanization contained approximately 10% sulphur has a peak value for its dielectric constant. An insulating material for submarine conductors should, of course, possess low conductivity and a low dielectric constant in order that the transmission losses caused by the insulation may be suitably small. It is indicated by the curves, however, that a material having the mechanical properties best suited for an insulating material for submarine cables, that is, one which before vulcanization had a sulphur content of approximately 12 to 14%, has comparatively poor electrical properties. The curves also indicate that a material made of approximately 5% sulphur and 95% rubber by weight, and a material made of approximately 20% sulphur and 80% rubber, possess improved electrical properties. These materials, however, are not suited for insulating submarine conductors since the one with the low sulphur content before vulcanization is too soft at a temperature of approximately 0° C. and the other material is too brittle at this temperature.

In accordance with the present invention an insulating material having mechanical and electrical properties which make it suitable as an insulating material for submarine conductors is produced by preparing two mixtures of sulphur and raw rubber, one comprising approximately 95% rubber and 5% sulphur by weight and the other comprising approximately 80% rubber and 20% sulphur. After thoroughly mixing as by working on the rolls of a standard rubber mill, each mixture is heated to a temperature sufficiently high to produce vulcanization, a temperature of approximately 150° C. maintained for a period of approximately 16 hours having been found suitable for this purpose. The next step in the process is to render the material suitably thermoplastic; this may be accomplished by maintaining the material at a temperature well above that required to produce vulcanization, a temperature of approximately 235° C. maintained for a period of about 10 hours having been found to give satisfactory results. Instead of prevulcanizing at a low temperature the process may be continuous, i. e., the temperature may be raised to the high value without interruption. The preferred values of heating periods and temperatures for producing vulcanization and for rendering the materials suitably thermoplastic are given above, but somewhat different values may be employed for producing approximately the same results. For instance, temperatures between 200 and 280° C. may be employed for rendering the material suitably thermoplastic. The two compounds produced from the mixtures of rubber and sulphur are thoroughly mixed as by working on the rolls of a standard rubber mill either before or after being subjected to this high temperature. While these materials may be mixed in various proportions it has been found preferable to mix approximately three parts of the material which before vulcanization contained 20% sulphur with two parts of the material which before vulcanization contained 5% sulphur. It has been found that this mixture of thermoplastic materials has approximately the same thermoplastic properties as those of gutta percha or as those of a thermoplastic material produced from approximately 86% raw rubber and 14% sulphur. It has been found, moreover, that mixing together the two thermoplastic materials (or two vulcanized materials which are heated to a high temperature after mixing) does not appreciably alter their electrical properties, so that the electrical properties, such as dielectric constant and conductivity, of the mixture of the two thermoplastic materials described above are of the same order as those of the thermoplastic material produced from 95% raw rubber and 5% sulphur or from 80% rubber and 20% sulphur.

The mixture of the two thermoplastic materials is now suitable for use in the extrusion process for applying insulation to cable conductors. In this process the material is maintained at a temperature of approximately 80 to 100° C. If desired, however, other materials such as balata or mineral rubber may be mixed with these thermoplastic materials. Good results have been obtained by insulating submarine conductors with a material containing the following ingredients, the percentage of each material being given with respect to the total weight.

| | Per cent. |
|---|---|
| Plastic material (20% sulphur, 80% rubber) | 38.5 |
| Plastic material (5% sulphur 95% rubber) | 24.0 |
| Mineral rubber | 14.5 |
| Balata | 23.0 |

In this mixture, the mineral rubber softens the material and the balata somewhat improves its plastic properties.

The term "thermoplastic", as used in this specification and the appended claims, should be taken to denote the property, possessed by a material, of varying its plasticity in accordance with variations in its temperature. By qualifying the term "thermoplastic" in this specification and the appended claims by comparing such property with the thermoplastic properties of gutta percha it is intended that the term, as qualified, should approximately represent such variations in plasticity as are manifested by gutta percha within the temperatures, which, on one hand, exist at the sea bottom or other places where conductors insulated with gutta percha are ordinarily placed for operation and may be below zero degrees centigrade, and which, on the other hand, are ordinarily maintained during the extruding process in the manufacture of gutta percha insulated cables and do not exceed 100° C.

What is claimed is:

1. The process of producing an insulating material, which comprises subjecting each of a plurality of compounds the constituents of which comprise rubber and sulphur in different proportions, respectively, to a temperature well above that required to produce vulcanization, and mixing said compounds.

2. The process of producing an insulating material, which comprises subjecting each of a plurality of compounds the constituents of which comprise rubber and sulphur in different proportions, respectively, to a temperature between 200° C. and 280° C., and mixing said compounds.

3. The process of producing an insulating material, which comprises preparing two mixtures of rubber and sulphur in different proportions, respectively, subjecting said mixtures separately to a temperature above that required to produce vulcanization for producing compounds having suitable thermoplastic properties, and then mixing said compounds.

4. The process of producing an insulating material, which comprises preparing two mixtures of rubber and sulphur in different proportions respectively, subjecting said mixtures separately to a temperature between 200° C. and 280° C., for producing compounds having suitable thermoplastic properties, and then mixing said compounds.

5. The process of producing an insulating material, which comprises preparing two mixtures of rubber and sulphur in different proportions, respectively, heating said mixtures at approximately 150° C. for a period of about 16 hours, and heating the resulting compounds, at approximately 235° C. for a period of about 10 hours for rendering the compounds suitably thermoplastic.

6. An insulating material comprising a mixture of a plurality of compounds, the constituents of which comprise rubber and sulphur in different proportions, respectively, which compounds have been heated to a temperature well above that required to produce vulcanization.

7. An insulating material comprising a mixture of a plurality of compounds the constituents of which comprise rubber and sulphur, the constituents of one of said compounds comprising less than 10% sulphur by weight of the total rubber sulphur content and the constituents of the other of the compounds comprising more than 12½% sulphur by weight of the total rubber sulphur content, which compounds have been heated to a temperature well above that required to produce vulcanization.

8. An insulating material comprising a mixture of a plurality of compounds, the constituents of one of said compounds comprising approximately 20% sulphur and 80% rubber by weight and the constituents of the other of said compounds comprising approximately 5% sulphur and 95% rubber by weight, which compounds have been heated to a temperature well above that required to produce vulcanization.

9. An insulating material in accordance with claim 8 in which approximately three parts of the compound, the constituents of which comprise about 20% sulphur and 80% rubber by weight, are mixed with two parts of the compound, the constituents of which comprise about 5% sulphur and 95% rubber by weight.

10. An insulating material comprising a mixture of a plurality of compounds, the constituents of which comprise rubber and sulphur in different proportions, respectively, which compounds have been heated to a temperature well above that required to produce vulcanization, and a material such as balata added to the mixture of said compounds.

In witness whereof, I hereunto subscribe my name this 24th day of February, A. D. 1927.

ARCHIE R. KEMP.